US008275242B2

(12) United States Patent
Nishiura

(10) Patent No.: US 8,275,242 B2
(45) Date of Patent: Sep. 25, 2012

(54) RECORDING/REPRODUCING APPARATUS AND DISPLAY CONTROL METHOD

(75) Inventor: Hiromi Nishiura, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1093 days.

(21) Appl. No.: 11/845,840

(22) Filed: Aug. 28, 2007

(65) Prior Publication Data

US 2008/0138035 A1  Jun. 12, 2008

(30) Foreign Application Priority Data

Dec. 7, 2006 (JP) ................. 2006-330112

(51) Int. Cl.
*H04N 9/80* (2006.01)

(52) U.S. Cl. ...................................... 386/241

(58) Field of Classification Search ............... 386/200, 386/241, 242, 296
See application file for complete search history.

(56) References Cited

U.S. PATENT DOCUMENTS 5,546,191 A * 8/1996 Hibi et al. ............ 386/291
5,974,218 A * 10/1999 Nagasaka et al. ............ 386/200
7,545,413 B2 * 6/2009 Lee ............ 348/231.2
7,594,255 B2 * 9/2009 Yamamoto et al. ............ 725/153
7,796,866 B2 * 9/2010 Lee ............ 386/241

FOREIGN PATENT DOCUMENTS

JP  2005-108066  4/2005
JP  2005-151085  6/2005

* cited by examiner

*Primary Examiner* — Huy T Nguyen

(74) *Attorney, Agent, or Firm* — Antonelli, Terry, Stout & Kraus, LLP.

(57) ABSTRACT

If a program is reproduced on a thumbnail image screen in thumbnail image display, it is effective for judging whether the program is a desired program. A program desired by a user is viewed at a timing not intended by the user because important scenes are viewed beforehand on the thumbnail image display screen in some cases. The recording/reproducing apparatus is structured in such a manner that a thumbnail image display method can be automatically changed for each program in accordance with whether it is highly recognized that the program is viewed by a user.

7 Claims, 6 Drawing Sheets

FIG.2

| (A) RECORD DAY/TIME | (B) LAPSE TIME | (C) VIEW STATE | (D) RECORD METHOD | (E) USER SETTING |
|---|---|---|---|---|
| (F) THUMBNAIL IMAGE DISPLAY METHOD | (G) UPDATE FLAG | (H) THUMBNAIL IMAGE AUDIO/VIDEO DATA | | (I) USER IDENTIFICATION |

FIG.3

THUMBNAIL IMAGE SETTING

■ DESIGNATE DISPLAY SCENE

☐ DISPLAY ONLY START

☐ DIGEST REPRODUCTION (1)

☐ DIGEST REPRODUCTION (2) (IMPORTANT SCENE REPRODUCTION)

☐ AUTOMATIC SETTING

[DECIDE]

RECORDING/REPRODUCING APPARATUS AND DISPLAY CONTROL METHOD

INCORPORATION BY REFERENCE

The present application claims priority from Japanese application JP2006-330112 filed on Dec. 7, 2006, the content of which is hereby incorporated by reference into this application.

BACKGROUND OF THE INVENTION

The present invention relates to a recording/reproducing apparatus for recording/reproducing information in/from a recording medium and its display control method.

JP-A-2005-151085 describes that an issue of "creating thumbnail images, to be used for searching a program recorded by record reservation, by using characteristic representative images of each program", is solved by using a solution means for "if a representative image of each program recorded in a hard disk 63 by repetitive recording reservation is acquired by designating an image at a new lapse time different from a lapse time set as a default value, making a microcomputer 76 generate an update program recording table for acquiring a representative image at the new lapse time, and generating as the representative images in succeeding recording reservations, record program search thumbnail images by using the update program recording table".

SUMMARY OF THE INVENTION

A recording capacity of a recording/reproducing apparatus has recently increased greatly. For example, a very large amount of information can be recorded and reproduced by an HDD recorder and a large capacity recording/reproducing apparatus of a PC, a home server or the like.

By using recording functions of these recording/reproducing apparatus, it becomes possible for a user to perform recording reservation of a program the user wants to view, and to perform automatic recording of a program related to a keyword designated by the user. Even if a keyword or the like is not designated, it is also possible to perform automatic recording of a program which is supposed that a user would like to view, by analyzing user preference from a past recording reservation history.

Under these circumstances, there exist a number of programs nowadays in a large capacity recording medium, the programs including those reserved and recorded by a user who wanted to view them and those automatically recorded because of a user possibility of viewing them. One HDD recorder, one home server or the like may be used by a single user or a large number of users such as sharing by all family members.

If a large number of programs are recorded as in the above case, it is difficult to manage what programs are recorded, and when a desired program is to be viewed, it is difficult to judge which user intends to view which program.

In order to facilitate a search of a desired program, a conventional recording/reproducing apparatus displays a list of thumbnail images of programs recorded in a recording medium. In the case of automatic recording by a keyword or the like, automatic recording based upon user preference, or the like, since it is difficult to analogize the content of each recorded program from a list of thumbnail images, it is performed in some cases to extract characteristic scenes of each program.

However, if a list of thumbnail images of characteristic scenes is displayed, a scene a user wants to view may be displayed before the whole program is reproduced, or a characteristic scene of a program is viewed at a timing not intended by a user. In the case of a program, particularly a program a user wants to view, for example, the whole program is viewed after the last scene of movie or drama has already been viewed or the match result of sports has already been known. This loses interest of the user.

As described above, displaying one scene of a program or extracting and displaying characteristic scenes on a thumbnail image display screen is not necessarily a method suitable for a user. JP-A-2005-151085 does not disclose techniques regarding this issue.

It is therefore an object of the present invention to provide a recording/reproducing apparatus and a display method capable of solving the above-described problems.

In order to solve the above-described problems, the present invention adopts illustratively the configurations recited in claims.

According to the present invention, it is possible to provide a recording/reproducing apparatus and a display method capable of easily searching a desired program.

Other objects, features and advantages of the invention will become apparent from the following description of the embodiments of the invention taken in conjunction with the accompanying drawings.

BRIEF DESCRIPTION OF THE DRAWINGS

FIG. 2 shows thumbnail image display data.

FIG. 3 shows a thumbnail image display setting screen.

DESCRIPTION OF THE EMBODIMENTS

Embodiments of the present invention will now be described with reference to the accompanying drawings.

First Embodiment

In this embodiment, description will be made on an example of a recording/reproducing apparatus in which a thumbnail image display method is changed with a view state of each recorded program.

Figure 1:
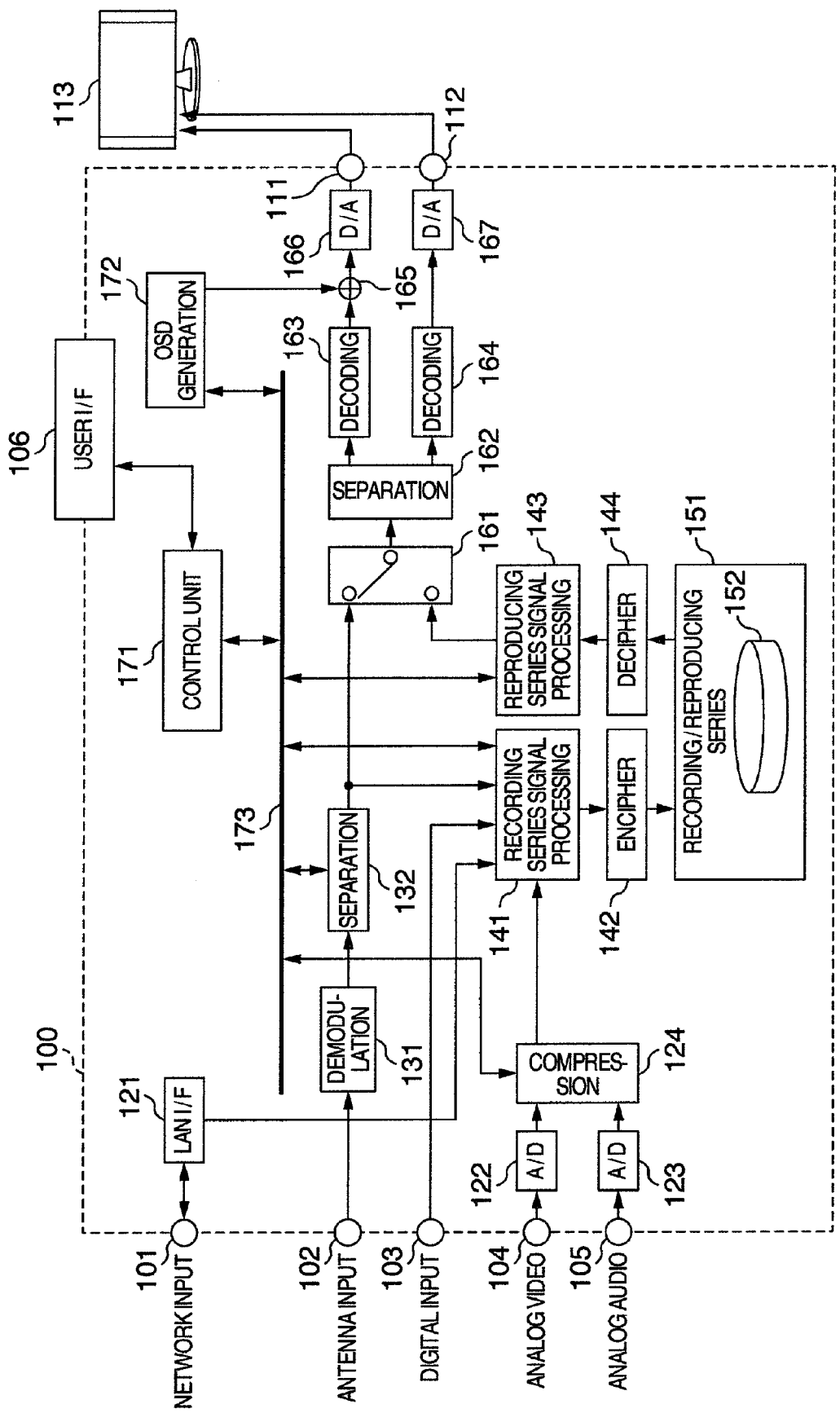
FIG. 1 is a block diagram of a recording/reproducing apparatus.

First, the structure of the recording/reproducing apparatus will be described with reference to FIG. 1. FIG. 1 is a block diagram showing an example of the recording/reproducing apparatus which can receive digital broadcasting and record information in a recording medium or can reproduce recorded data to obtain a reproduced output.

A recording/reproducing apparatus 100 is constituted of: an input terminal 102 for inputting a reception wave at an antenna; an input terminal 103 for inputting compressed audio/video data from another apparatus; an analog video input terminal 104 for inputting an analog video signal; an analog audio input terminal 105 for inputting an analog audio signal; a network input terminal 101 for inputting a data signal; a LAN I/F 121; analog/digital (A/D) converter circuits 122 and 123 for converting an analog signal into a digital signal; a demodulator circuit 131; a separator circuit 132 for separating a demodulated digital signal into audio, video and other data; a compression circuit 124 for compressing a digitalized audio/video signal; a recording signal processing circuit 141; an enciphering circuit 142 for enciphering data to be recorded; a recording/reproducing series 151 including a drive function for a recording medium; a recording medium 152; a deciphering circuit 144 for deciphering data enciphered and recorded in the recording medium; a reproducing series signal processing circuit 143; a switching circuit 161, a separator circuit 162, a video decoding circuit 163; a digital/analog (D/A) converter circuit 166: a video input terminal 111; an audio decoding circuit 164; a D/A converter circuit 167; an audio output terminal 112; a TV set 113; a user I/F 106; a control unit 171; a system bus 173; an On Screen Display (OSD) generator unit 172; and an addition circuit 165.

In recording, a signal transmitted and received from digital broadcasting or the like is demodulated at the demodulator circuit 131 by a predetermined method. The demodulated signal is subject to necessary signal processing such as timing adjusting data addition and modulation at the recording series signal processing circuit 141, and is enciphered at the enciphering circuit 142 to be thereafter recorded in the recording medium 152 by the recording/reproducing series 151.

A digital signal input from the digital input terminal 103 is subject to necessary signal processing such as timing adjusting data addition and modulation at the recording series signal processing circuit 141, and is enciphered at the enciphering circuit 142 to be thereafter recorded in the recording medium 152 by the recording/reproducing series 151.

An analog video signal input from the analog video input terminal 104 and an analog audio signal input from the analog audio input terminal 105 are compressed at the compression circuit 124, passed through the recording series signal processing circuit 141, and enciphered at the enciphering circuit 142 to be thereafter recorded in the recording medium 152 by the recording/reproducing series 151.

For data communications via a network, a signal input from the network input terminal 101 is input via the LAN I/F 121 to the recording series signal processing circuit 141 to be processed, and enciphered at the enciphering circuit 142 to be thereafter recorded in the recording medium 152 by the recording/reproducing series 151.

In reproducing, enciphered digital data read from the recording medium 152 via the recording/reproducing series 151 in response to a user designation is deciphered at the deciphering circuit 144, and is subject to signal processing necessary for reproduction such as demodulation, at the reproduction series signal processing circuit 143 by a predetermined modulation scheme, to be sent to the separation circuit 162 via the switching circuit 161. The video decoding circuit 163 executes a predetermined video decoding process, and the D/A converter circuit 166 converts the digital data into an analog signal to be displayed on a monitor of the TV set 113 via the video output terminal 111. The audio decoding circuit 164 executes a predetermined audio decoding process, and the D/A converter circuit 167 converts the digital data into an analog signal to be output from an audio output mechanism of the TV set 113 via the audio output terminal 112.

The control unit 171 controls each component of the recording/reproducing apparatus 100 via the system bus 173, and controls the whole apparatus to make it operate in accordance with a user designation input via the user I/F 106. A designation input request to a user or an OSD display to a necessary user is prepared by the OSD generator 172, added to an output of the video decoding circuit 163 at a proper level at the addition circuit 165, and finally realized by outputting the addition result to the monitor screen of the TV set 113.

Data to be recorded in the recording/reproducing apparatus and data for thumbnail image display are recorded in the recording medium 152 via the recording/reproducing series 151 under control of the control unit 171 to properly perform thumbnail image display.

Next, with reference to FIG. 2, description will be made on an example of thumbnail image display data. The thumbnail image display data is constituted of (A) record day/time, (B) lapse time, (C) view state, (D) record method, (E) user setting, (F) thumbnail image display method, (G) update flag, (H) thumbnail image audio/video data, and (I) user identification. One or more of this data is generated per one recorded content. In the following, (A) to (I) will be described sequentially.

The record day/time (A) is day/time when the corresponding program was recorded. If a content recorded with an external apparatus such as a camera is dubbed, day/time of recording with the camera is copied.

The lapse time (B) is a lapse time from the record day/time to the current day/time.

The view state (C) indicates whether the corresponding program has already been viewed or not. When recording the program, a non-view state is set, and the non-view state is changed after viewing the program. For viewing, an operation history is stored indicating how many times the content of the program or the content of each genre was viewed.

The record method (D) indicates whether the corresponding program was recorded by user designation, was recorded automatically by user preference, or the like.

The user setting (E) indicates whether a user designates the thumbnail image display method for the corresponding program.

The thumbnail image display method (F) indicates a thumbnail image display method determined from the conditions of (A) to (E).

The update flag (G) indicates whether the thumbnail image audio/video data is required to be updated. An example of using the update flag (G) will be later described in the second embodiment.

The thumbnail image audio/video data (H) is thumbnail image audio/video data generated by the thumbnail image display method.

The user identification (I) identifies a user among a plurality of users sharing one recording/reproducing apparatus. Even of the same content, the view state or the like may differ among different users. In such a case, if the user can be identified by the user identification (I), the thumbnail image display method can be changed for each user.

Next, with reference to FIG. 3, description will be made on the thumbnail image display method which can be set by a user. FIG. 3 shows an example of a thumbnail image display setting screen capable of being set by a user. Description will be made assuming that the embodiment has five types of the thumbnail image display method: "designate display scene", "display only start", "digest display (1)", "digest display (2)", and "automatic setting", as shown in FIG. 3. These five types will be described hereunder.

(1) As a user selects "designate display scene", "display scene designation" is selected as the thumbnail image display method. In the case of "display scene designation", of a content or chapter for thumbnail image display, a scene designated by a user is displayed so that a location of thumbnail image display can be set specifically. In order to deal with user intention or setting of the recording/reproducing apparatus, the display scene may be either a still image or a moving image.

A still image at a location designated by a user or data in a range designated by a user is generated. If there are a plurality of data sections, data management/time information is arranged and stored in a thumbnail image audio/video data area.

(2) As a user selects "display only start", "display start scene" is selected as the thumbnail image display method. In the case of "display start scene", although an important scene of a program is not displayed, an opening scene of the program or a scene displaying the title of a drama is displayed in order to make the user know the program. The scene may also be a still image or a moving image.

(3) As a user selects "digest reproduction (1)", "digest reproduction (1)" is selected as the thumbnail image display method.

(4) As a user selects "digest reproduction (2)", "digest reproduction (2)" is selected as the thumbnail image display method.

With reference to examples shown in FIGS. 7(1) to 7(3), description will be made on the "digest reproduction (1)" and "digest reproduction (2)".

The "digest reproduction (1)" is used when a user does not want to view the important scene as a thumbnail display image and if the user wants to know the program content from a title, a record day/time and a simple content. In this case, although a portion characteristic to the program to some extent is displayed as the thumbnail image, a scene having a high importance degree is not displayed.

Figure 7:
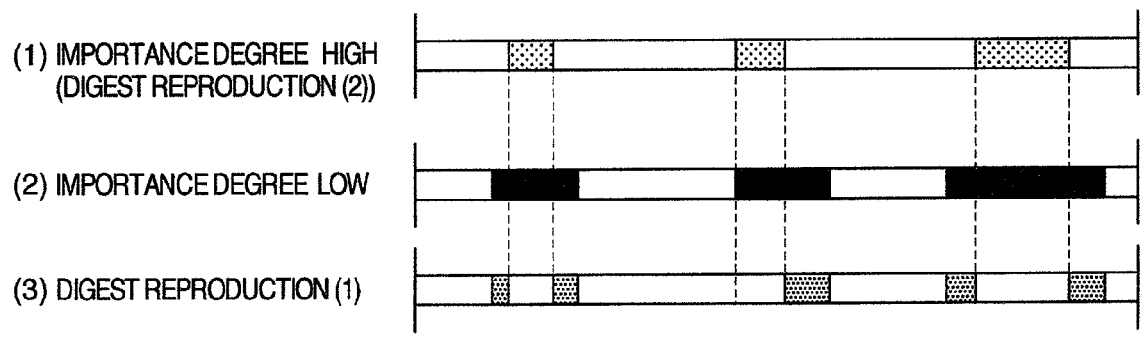
FIG. 7 is diagrams showing areas where a digest is reproduced.

In FIG. 7(1), a scene having a high importance degree in one content is displayed as a hatched portion. In FIG. 7(2), a scene having an importance degree lower than that of FIG. 7(1) is displayed as a hatched portion. In FIG. 7(3), a most important scene is removed from each important scene in one content.

In the "digest reproduction (1)", the hatched portions in FIG. 7(3) are displayed. In this case, management/time information on data obtained by deleting the hatched portions of FIG. 7(1) from the hatched portions of FIG. 7(2) is arranged and stored in the thumbnail image audio/video area.

In the "digest reproduction (2)", if the program content cannot be analogized from only a title, a record day/time or a simple content, the thumbnail image display is performed including scenes of a high importance degree. For example, this may be the case in which a long time has elapsed after the program was recorded, and program view/deletion can be judged by viewing scenes having a high importance degree in the program. In this case, the scenes having the high importance degree shown in FIG. 7(1) are displayed as thumbnail images. Management/time information on data of the hatched portions in FIG. 7(1) is arranged and stored in the thumbnail image audio/video area.

(5) As a user selects "automatic setting", it is possible to automatically set thumbnail images. Assuming that the "automatic setting" is not set on the thumbnail image display setting screen, default setting when a program is recorded is set to "automatic setting". A load on a user operation can therefore be reduced.

Of the five types of the thumbnail image display methods described above, if one of the "designate display scene", "display only start scene", "digest reproduction (1)" and "digest reproduction (2)" is selected, the user setting (E) is set to "ON and the set method is set to the thumbnail image display method (F). If the "automatic setting" is selected, the user setting (E) is set to "OFF.

Figure 4:
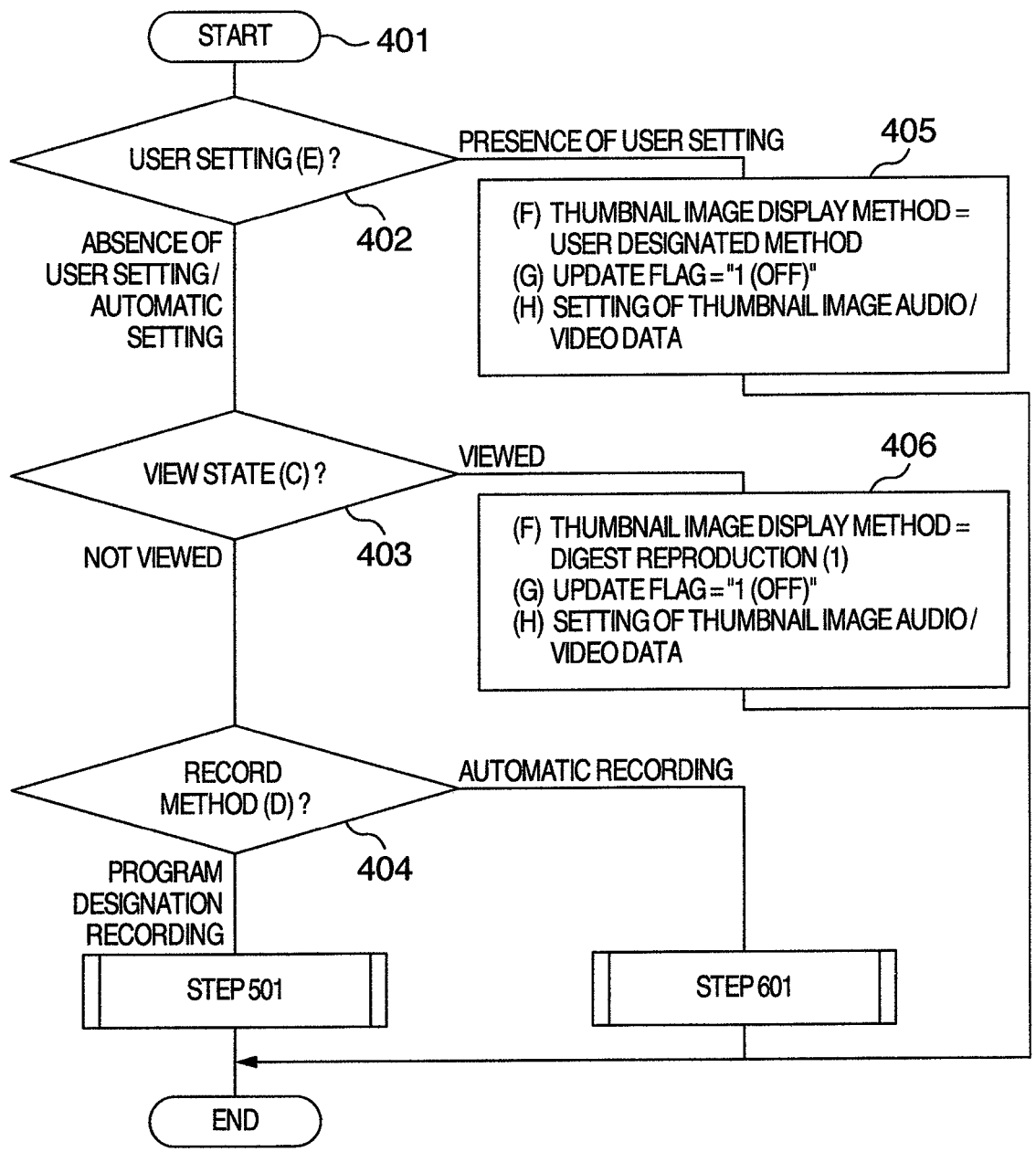
FIG. 4 is a flow chart illustrating a process of determining a thumbnail image display method.

With reference to FIG. 4, description will be made on the thumbnail image display method for a program, by using the above-described structure. FIG. 4 is a flow chart illustrating a process of determining the thumbnail image display method.

Timings when the thumbnail image display method are determined (timings when Step 401 starts) include when a program reservation is set, when a user operates to perform thumbnail image setting, when a non-view state changes to a viewed state, and other timings. Step 401 may start automatically at a predetermined period.

After the process start at Step 401, first at Step 402, (E) in the thumbnail image display data is referred to judge whether a user sets the thumbnail image display method for the corresponding program.

If the user setting is "ON", it is judged that there is setting by the user. In this case, since the thumbnail image display method (F) is already set, the process is terminated. The thumbnail image audio/video data (H) is set so as to correspond to the thumbnail image display method (F).

If the user setting is "OFF", it is judged that the thumbnail image display method (F) has not been set by the user, or the user has set automatic setting. In this case, the flow advances to Step 403.

At Step 403 the view state (C) is referred to judge the view state. If the program has already been viewed, the digest reproduction (1) is set as the thumbnail image display method. If the program has not been viewed, the flow advances to Step 404.

At Step 404 the record method (D) is referred to judge the record method. In the case of program designation recording by a user, the flow advances to Step 501 (FIG. 5), and in the case of automatic recording, the flow advances to Step 601 (FIG. 6).

Figure 5:
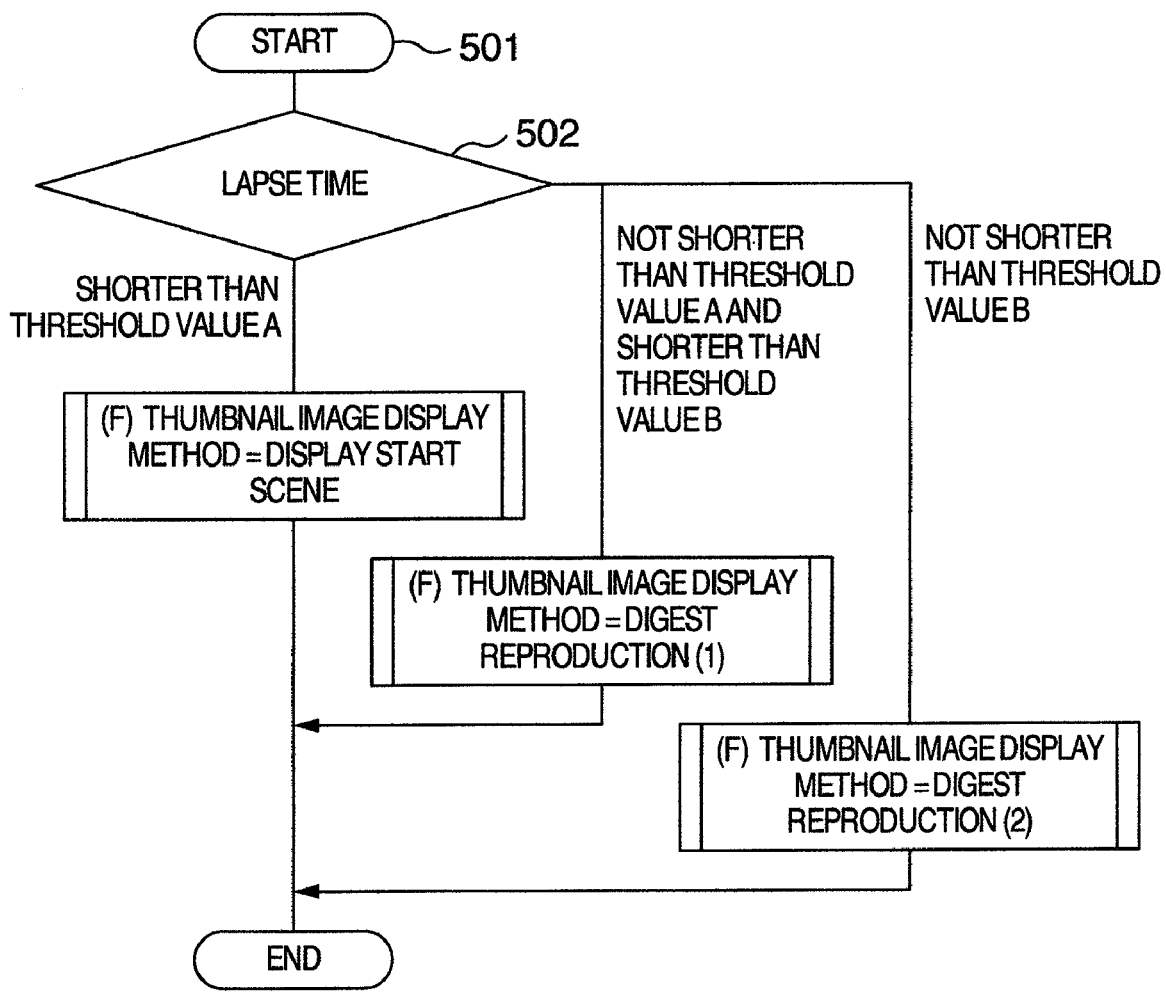
FIG. 5 is a flow chart illustrating a process of determining a thumbnail image display method for program designation recording.
Figure 6:
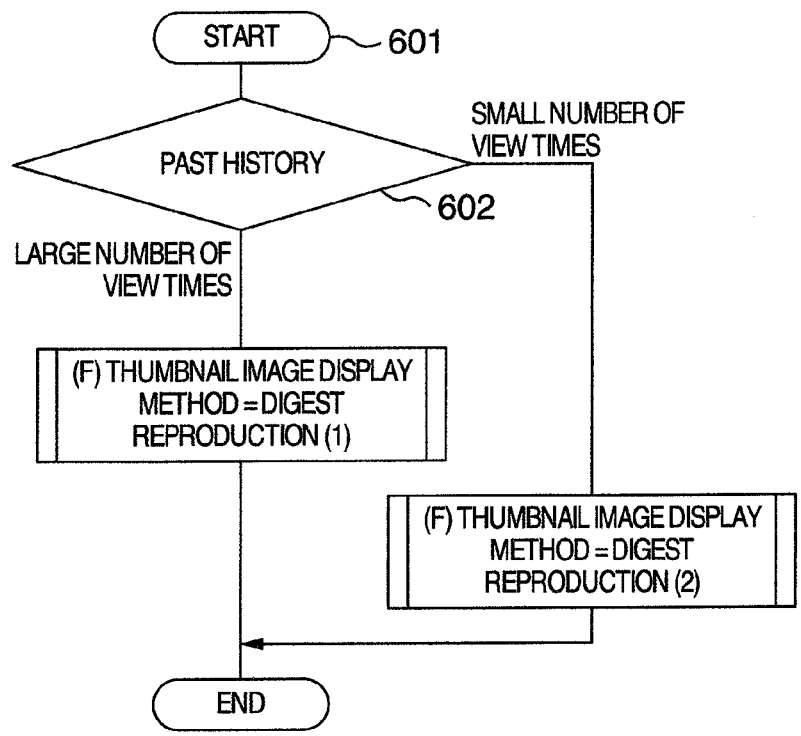
FIG. 6 is a flow chart illustrating a process of determining a thumbnail image display method for an automatic reservation program.

With reference to FIG. 5, Step 501 will be described. FIG. 5 is a flow chart illustrating a process of determining the thumbnail image display method for program designation recording by a user. A program in this flow is a program recorded by a user desiring to view it, and has a higher importance degree.

Two threshold values A and B are used as lapse time threshold values. In this embodiment, A<B.

The threshold value A indicates a lapse time until which time view/deletion of the program can be judged from simple information such as a program name and a record day/time, without confirmation using images and sounds of the program.

The threshold value B indicates a lapse time at which time it is better that there are some help of images and sounds of the program because view/deletion of the program is difficult to be judged only from the program name and record day/time.

At Step 502 the lapse time (B) is referred to execute a process in accordance with the plurality of threshold values (lapse times). If the lapse time (B) is shorter than the threshold value A, it is judged that the program content can be easily analogized from the program name or the like. The "display start scene" is therefore set as the thumbnail image display method.

If the lapse time (B) is not shorter than the threshold value A and is shorter than the threshold value B, it is judged that although some help of images and sounds of the program are required to judge the program content, the most important scene is not desired to be viewed in advance. The "digest reproduction (1)" is therefore set as the thumbnail image display method.

If the lapse time (B) is not shorter than the threshold value B, it is judged that the program content cannot be judged only from the program name and some images and sounds because the time has lapsed so long in the non-view state, and it is necessary to confirm the important scene. The "digest reproduction (2)" is therefore set as the thumbnail image display method.

With reference to FIG. 6, Step 601 will be described. FIG. 6 is a flow chart illustrating a process of determining the thumbnail image display method for a program recorded by automatic recording. A program in this flow is a program automatically recorded in accordance with user preference determined based on a genre and keyword entered by a user and a user record history. Therefore, a user cannot analogize easily the program content and it is difficult to judge whether the program is desired to be viewed or not. In this case, therefore, the content is judged by digest reproduction of a characteristic scene in thumbnail image display.

In the automatic reservation, there are two cases: it is better to confirm the program by viewing an important scene; and since there is a high possibility that the user views the corresponding program, it is better not to view the important scene in advance.

In the case of a program automatically recorded, user preference is analyzed from the past history to selectively use the digest reproductions (1) and (2).

To this end, at Step 602 the past history of whether the automatically recorded program has been viewed is judged, and if the number of view times is large, the digest reproduction (1) is set as the thumbnail image display method.

If the number of view times is small, the digest reproduction (2) is set as the thumbnail image display method.

The thumbnail image display method (F) is set in the manner described above.

After the thumbnail image display method (F) is set, if the user setting (E) is changed by a user operation or if the view state (C) changes because the user viewed the program, then the thumbnail image display method (F) changes also. In these cases, the update flag (G) and thumbnail image audio/video data (H) are changed in correspondence with the changed thumbnail image display method, at Steps 405 and 406, respectively.

If the thumbnail image display method (F) changes because of a change in the lapse time (B), Step 401 will not start depending upon a user operation and user program viewing action. In such a case, it is necessary to start Step 401 periodically. By starting Step 401 periodically, even if the thumbnail image display method (F) changes because of a change in the lapse time (B), it is possible to arrange the thumbnail image display data (A) to (H) to match the changed thumbnail image display method (F) before the user requests for thumbnail image display.

In the following, description will be made on the process of updating the thumbnail image display data (A) to (H) by using the update flag (G), when the thumbnail image display method (F) changes because of a change in the lapse time (B).

Second Embodiment

In this embodiment, description will be made on a process of efficiently updating the thumbnail image display data (A) to (H) by using the update flag (G) when the thumbnail image display method (F) changes with a lapse time from the record day/time.

In this embodiment, three values "1" to "3" are used as the update flags (G).

If the update flag is "1 (OFF)", it means that the thumbnail image display data is not updated.

If the update flag is "2", it means that although the thumbnail image display data is not updated immediately, there is a possibility that the thumbnail image display data is updated after a predetermined time lapse.

If the update flag is "3 (ON)", it means that the thumbnail image display data is updated immediately.

In this embodiment, the update flag (G) is set to each content (program) recorded in the recording apparatus, and the update flag (G) is updated periodically. In this case, for the program whose update flag (G) changed to "3(ON)", the thumbnail image display data (A) to (H) is updated so as to match the thumbnail image display method (F). Which update flag (G) is set initially to each content is determined as in the following.

If the user setting (E) is ON, at Step 405 in FIG. 4 the update flag (G) is set to "1(OFF)". Since the thumbnail image display method is determined by user intention, the thumbnail image display method (F) will not be changed by the lapse time (B) because the thumbnail image display data (A) to (H) is not required to be changed.

If the view state (C) indicates the program has been viewed, at Step 406 in FIG. 4 the update flag (G) is set to "1(OFF)". This is because if the program has been viewed, it can be considered that the content can be grasped easily, the thumbnail image display method (F) is not changed with the lapse time (B), and the thumbnail image display data (A) to (H) is not required to be updated.

If the record method (D) is program designation recording, at Step 501 in FIG. 4 the update flag (G) is set to "2". This is because since the user designates and records the program, the user can easily grasp the program content if a lapse time from program recording is short, and as the lapse time becomes longer, it can be considered that it becomes difficult to grasp the program content without some digests. In this case, therefore, the thumbnail image display method (F) is changed in accordance with the lapse time (B), and the thumbnail image display data (A) to (H) is also updated to match the changed thumbnail image display method (F). It is assumed that a method of changing the thumbnail image display method (F) with the lapse time (B) is similar to that described in the first embodiment.

If the record method (D) is automatic recording, at Step 601 in FIG. 4 the update flag (G) is set to "1(OFF)". In this case, it can be considered that since the recording/reproducing apparatus side automatically selects and records a program, it is better to display a digest irrespective of the lapse time (B) in order for the user to grasp the program content. In this case, therefore, the thumbnail image display method (F) will not be changed with the lapse time (B), and it is not necessary to update the thumbnail image display data (A) to (H).

Figure 8:
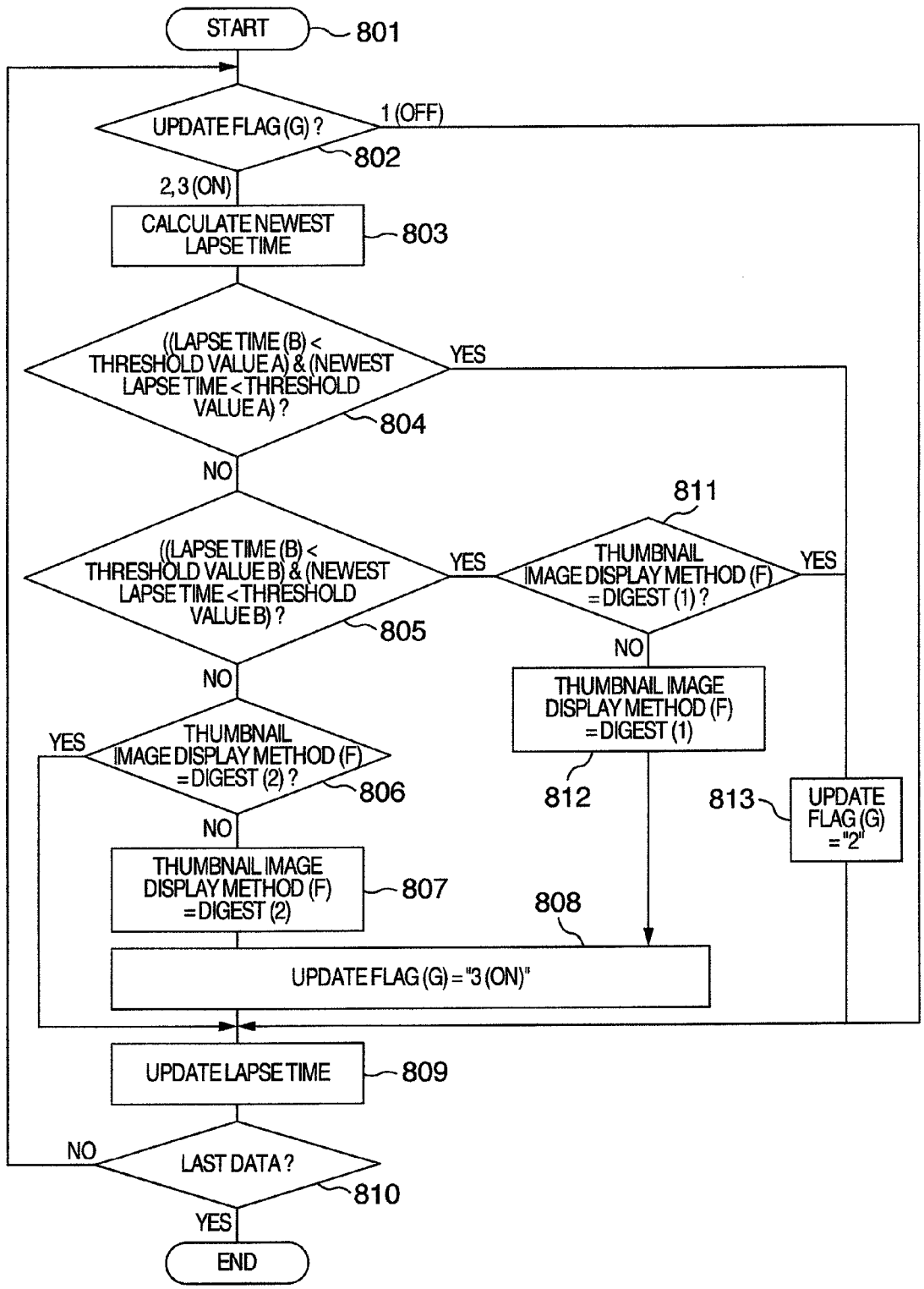
FIG. 8 is a flow chart illustrating a process of updating an update flag.

FIG. 8 is a flow chart illustrating a process of updating the update flag (G). The timing when this process starts may be an arbitrary timing irrelevant to each step of the process shown in FIG. 4, or may be determined by a user instruction. In this embodiment, it is assumed that the update flag is updated automatically and periodically.

As the update process starts at Step 801, at Step 802 the update flag (G) set to the program is referred. If the update flag is "1(OFF)", the flow advances to Step 809.

If the update flag (G) is "2" or "3(ON)", at Step 803 the newest lapse time is calculated from the record day/time (A), and the lapse time (B) is compared with the threshold values A and B. The lapse time (B) is not necessarily coincident with the newest lapse time, because the lapse time (B) is a lapse time from the record day/time at the time when the lapse time (B), which is one of the thumbnail image display data shown in FIG. 3, is updated.

It is judged at Step 804 whether both the newest lapse time and the lapse time (B) are smaller than the threshold value A. If both the lapse times are shorter than the threshold value A, it is not necessary to change the thumbnail image display method (F) immediately, so that the update flag is set to "2" at Step 813 to thereafter advance to Step 809. If both the lapse times are not shorter than the threshold value A, the flow advances to Step 805.

It is judged at Step 805 whether the newest lapse time is shorter than threshold value B and the lapse time (B) is shorter than the threshold value B. If both the lapse times are shorter than the threshold value B, i.e., if the lapse time B and newest lapse time are not shorter than the threshold value A and smaller than the threshold value B, it is necessary that the thumbnail image display method (F) be the digest reproduction (1). Therefore, at Step 811, the current thumbnail image display method (F) is referred. If it is the digest reproduction (1), no change is effected to advance to Step 813 and set the update flag (G) to "2". If it is not the digest reproduction (1), the flow advances to Step 812 to change to the digest reproduction 1 and set at Step 808 the update flag (G) to "3(ON)".

If it is judged at Step 805 that both the lapse time (B) and newest lapse time are not shorter than the threshold value B, it is necessary that the thumbnail image display method (F) be the digest reproduction (2). Therefore, at Step 806 the current thumbnail image display method (F) is referred. If it is not the digest reproduction (2), no change is effected to advance to Step 809. If it is not the digest reproduction (2), the flow advances to Step 807 to change to the digest reproduction (2) and set at Step 808 the update flag (G) to "3(ON)".

At Step 809 the lapse time (B) is updated to the newest lapse time. For example, it is judged at Step 808 whether the data is the last data, i.e., whether the program recorded in the recording/reproducing apparatus is the last program. If the data is the last data, the process is terminated. If there is the next data, the next data is used and the process returns to Step 802.

In this manner, the update flag (G) of each content recorded in the recording/reproducing apparatus is updated periodically. For the program having the update flag (G) set to "3(ON)", the thumbnail image display data (A) to (H) is updated to match the thumbnail image display method (F). In this embodiment, if a plurality of contents are recorded in the recording/reproducing apparatus, the update flags (G) of all the contents are first updated, and it is possible to update at a time the thumbnail image display data (A) to (H) for the contents having the update flag (G) of "3(ON)". Processing can therefore be executed at higher speed than the case in which the thumbnail image display data (A) to (H) is updated for each content after another.

In this embodiment, although the lapse time (B) and the newest lapse time are used separately, the same time may be used for these lapse times in order to simplify control and the like. In this case, at Steps 804 and 805 the lapse time (B) is compared with the threshold value A or B, and Steps 803 and 809 are not necessary.

Lastly, modifications of each embodiment will be described in the following.

The thumbnail image audio/video data (H) may be stored separately from the recorded program data. Alternatively, the thumbnail image audio/video data may be reproduced while it is generated during thumbnail image display. If the thumbnail image audio/video data is stored separately, display can be effected at high speed because the process of generating characteristic portions are already completed, for example, in digest reproduction in thumbnail image display.

A plurality of thumbnail image data sets may be stored for one content and each user. In this case, the corresponding thumbnail image data is referred in accordance with each viewing user. It is therefore possible to conduct thumbnail image display in accordance with user desire, even if the thumbnail image display method is different between a user already viewed a content and a user not viewed the content.

The thumbnail image display data may be generated for each content or for each chapter if one content is constituted of a plurality of chapters. It is therefore possible to display thumbnail images matching a user desire also on a chapter thumbnail image display screen.

The threshold values A and B of the lapse time may be fixed in the recording/reproducing apparatus, or may be set freely by a user. Although the lapse time after recording is used as a criterion of judging whether it is possible to analogize what content has a program, the criterion by the lapse time differs greatly for each user. If the threshold value can be set freely, the thumbnail image display method is determined by the threshold value matching the user judgement criterion. It is therefore possible to absorb a difference of the judgement criterion different among users, and to use the threshold value most suitable for each user.

Although two threshold value A and B are used, three or more threshold values may be used. In this case, the thumbnail image display method to be set by the threshold value may include the methods other than the digest reproduction (1) and digest reproduction (2). A user does not forget the content immediately when the lapse time set by a threshold value exceeds, but the user forgets gradually in many cases. Therefore, two or more threshold values are used and the section of digest reproduction generated from the content is changed stepwise. It is therefore possible to gradually and stepwise display important scenes of a content and perform thumbnail image display more properly for each user.

The importance degree of the digest reproduction (1) and digest reproduction (2) may be fixed in the recording/reproducing apparatus or may be set freely by a user. Since the important scene is different for each user, if the importance degree is set freely by a user, a scene matching user preference can be judged more easily.

As described so far, it is possible to provide a thumbnail image display method and a recording/reproducing apparatus capable of searching a desired program easily from programs recorded in a recording medium, preventing a program from being viewed at a timing not intended by a user.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A recording/reproducing apparatus for recording a content in a recording medium or reproducing a content from the recording medium, comprising:
   a recording unit for recording said content in said recording medium,
   a reproducing unit for reproducing said content from said recording medium; and
   a control unit for controlling said recording unit and said reproducing unit, wherein said control unit implements a thumbnail image display method of displaying a thumbnail image representative of said content, in accordance with a view state of said content, wherein said thumbnail image display method implemented is one of a plurality of predetermined thumbnail image display methods selectable in said recording/reproducing apparatus;

said control unit implements as said thumbnail image display method a first display method of displaying a portion of characteristic portions of said content excluding a portion having a high importance degree, if the view state of said content indicates that said content has already be viewed; and said control unit implements said thumbnail image display method in accordance with a record method used for recording said content, if the view state of said content indicates that said content has not been viewed.

2. The recording/reproducing apparatus according to claim 1, wherein:

said control unit implements as said thumbnail image display method said first display method or a second display method of displaying a portion having a high importance degree among characteristic portions of said content, if said record method is automatic recording by the recording/reproducing apparatus; and said control unit implements as said thumbnail image display method a start scene display method of displaying a start scene of said content, said first display method or said second display method, in accordance with a lapse time from day/time when said content was recorded, if said record method is designation recording designated by a user of the recording/reproducing apparatus.

3. A recording/reproducing apparatus for recording a content in a recording medium or reproducing a content from the recording medium, comprising:

a recording unit for recording said content in said recording medium;

a reproducing unit for reproducing said content from said recording medium; and a control unit for controlling said recording unit and said reproducing unit, wherein said control unit implements a display method for a thumbnail image representative of said content in accordance with whether a record method is a designation recording designated by a user of the recording/reproducing apparatus or is an automatic recording by the recording/reproducing apparatus based on a user record history without a user designation.

4. The recording/reproducing apparatus according to claim 3, wherein:

said control unit implements as said thumbnail image display method a first display method of displaying a portion of characteristic portions of said content excluding a portion having a high importance degree or a second display method of displaying a portion having a high importance degree among characteristic portions of said content, if said record method is automatic recording by the recording/reproducing apparatus based on the user record history without a user designation; and said control unit implements as said thumbnail image display method, a start scene display method of displaying a start scene of said content, said first display method or said second display method, in accordance with a lapse time from day/time when said content was recorded, if said record method is designation recording designated by a user of the recording/reproducing apparatus.

5. A display control method for a recording/reproducing apparatus for recording a content in a recording medium or reproducing a content from the recording medium, wherein:

a first display method of displaying a portion of characteristic portions of said content excluding a portion having a high importance degree is implemented as a thumbnail image display method of displaying a thumbnail image representative of said content, if the view state of said content indicates that said content has already been viewed; and said thumbnail image display method is implemented in accordance with a record method used for recording said content, if the view state of said content indicates that said content has not been viewed, wherein said thumbnail image display method implemented is one of a plurality of predetermined thumbnail image display methods selectable in said recording/reproducing apparatus.

6. The display control method according to claim 5, wherein:

said first display method or a second display method of displaying a portion having a high importance degree among characteristic portions of said content is implemented as said thumbnail image display method, if said record method is automatic recording by the recording/reproducing apparatus; and a start scene display method of displaying a start scene of said content, said first display method or said second display method is implemented as said thumbnail image display method, in accordance with a lapse time from day/time when said content was recorded, if said record method is designation recording designated by a user of the recording/reproducing apparatus.

7. A display control method for a recording/reproducing apparatus for recording a content in a recording medium or reproducing a content from the recording medium, wherein:

a first display method of displaying a portion of characteristic portions of said content excluding a portion having a high importance degree or a second display method of displaying a portion having a high importance degree among characteristic portions of said content is implemented as a thumbnail image display method of displaying a thumbnail image representative of said content, if a record method used for recording said content is automatic recording by the recording/reproducing apparatus based on a user record history without a user designation; and a start scene display method of displaying a start scene of said content, said first display method or said second display method is implemented as said thumbnail image display method, in accordance with a lapse time from day/time when said content was recorded, if said record method is designation recording designated by a user of the recording/reproducing apparatus.

* * * * *